US006250556B1

(12) United States Patent
Schneider

(10) Patent No.: US 6,250,556 B1
(45) Date of Patent: Jun. 26, 2001

(54) MULTI-PURPOSE INVENTORY TAG DEVICE AND METHOD

(76) Inventor: Frank Gene Schneider, 4654 Richfield Ave., West Valley City, UT (US) 84120

( * ) Notice: Subject to any disclaimer, the term of this patent is extended or adjusted under 35 U.S.C. 154(b) by 0 days.

(21) Appl. No.: 09/535,797

(22) Filed: Mar. 28, 2000

(51) Int. Cl.[7] ..................................................... G06K 19/00
(52) U.S. Cl. ............................................. 235/487; 235/375
(58) Field of Search ..................................... 235/375, 487

(56) References Cited

U.S. PATENT DOCUMENTS 6,102,290 * 8/2000 Swartz ................................. 235/375

* cited by examiner

*Primary Examiner*—Harold I. Pitts
(74) *Attorney, Agent, or Firm*—Marcus G. Theodore

(57) ABSTRACT

An inventory control device and method to check in and track vehicles being repaired using a pad of a plurality of sequentially numbered stacked bendable sheets made of a tear resistant material removably adhered to one another with re-usable adhesive strips, each sheet scored to removably separate into at least three parts: a numbered control tag with edges containing the adhesive strip along at least one edge to removably attach to an article, and having an inventory number on both sides of the control tag, which is sufficiently large to be viewed from a distance; a customer claim check having corresponding numbering to the control tag, and a key tag having corresponding numbering to the control tag with ends of sufficient length and width to pass through an opening in an article and wrap about the article, the tag defining a longitudinal groove through which one end of the tag may loop through the groove and form a clove hitch knot about the article.

14 Claims, 3 Drawing Sheets

MULTI-PURPOSE INVENTORY TAG DEVICE AND METHOD

BACKGROUND OF THE INVENTION

1. Field

This invention relates to inventory control systems and methods. More particularly, it relates to an inventory control tagging system and method particularly suited for vehicle parking, repairs, and storage. It provides for control tagging of automobiles and trucks, but can be used with the tracking of other types of articles, and for patron admission. It also provides advertising, an inexpensive souvenir, ticketing, and coupons.

2. State of the Art

There are a number of different inventory control methods and devices using tags for numerical controls. Logging in of items and keeping track of their locations has always been a problem in a number of industries, such as the automotive and truck repair business. There has for sometime heretofore been recognition of the need to tag or identify vehicles with a low cost, disposable, identification system. Accordingly, a variety of systems have been known prior to this invention.

Two systems in use at the present time are expensive and non-disposable. Both require tagging and retrieval from the vehicle before being returned to the owner. Another system is less expensive using disposable tags attached to the rear view mirror bracket, and is not suitable for use where these brackets are not present as in medium and heavy duty trucks, which do not have inside rear view mirrors. All products and systems in use at the present time require a separate device for the attachment of key identification tags at additional expense. Furthermore, all products currently in use tend to blow off or fall onto the floor of the vehicles during road tests, rendering them useless for viewing from outside the vehicle.

There remains a need for a simple inexpensive disposable tracking system using tags, which can also be used to provide advertising and discount coupon services, as well as admission to various events. The present invention is particularly suited for the automotive and truck service industry where numerical control of vehicles and their keys is required for locating vehicles, and job dispatch purposes. It provides a device and multipurpose tracking method described below satisfying these requirements.

SUMMARY OF THE INVENTION

It is one objective of the invention to provide a control numbering system that can be placed directly on the inside of the windshield by means of a pre-pasted non-marking glue.

It is another objective of the invention to provide a key tag that is detached from the vehicle tag and removably attached to an article such as a key or key ring by means of looping around the key or key ring and back through itself It is yet another objective of the invention to provide a detachable customer claim check with a referencing control number.

In accordance with these objectives, the invention provides a more universal attaching system which is more permanent while in use, easy to use, disposable, and eliminates the need for a second attaching device for the key tag. The invention meeting these objectives is an inventory control pad comprised of a plurality of sequentially numbered removably stacked bendable sheets. These sheets have different inventory control numbers, which are generally numbered in consecutive order increasing from top to bottom. These sheets are made of flexible paper, plastic, or tear resistant materials such as that produced by Dupont Corporation under the tradename Tyvek.

Each sheet has an adhesive strip usually placed along its top edge to self adhere until used. Upon removal of a sheet, the adhesive is still sufficiently tacky to allow the sheet to removably adhere to the surface of an item. Generally, the preferred adhesive is clear, non-marking, removable, and re-stickable such as that produced by 3M Corporation for use with Post-It® note pads.

Each sheet is scored or perforated to easily separate into at least three parts. The first part is a numbered control tag containing the adhesive strip to removably attach to an article. It has numbering sufficiently large to be viewed from a distance, such as when mounted to the window of an automobile or truck being repaired. Preferably, both sides of the control tag are printed with the same numbers or codes to be viewed from either side when mounted on a transparent surface, such as the front window of a vehicle or truck being serviced. The second part is a customer claim check having corresponding numbering or codes to the numbered control tag. It is relatively small so that it may be carried in a purse, wallet, or pocket of a customer, until it is time to redeem the automobile.

The third part is a wrapping tag with ends of sufficient length and width to pass through an opening in the article to be tagged, such as a keyhole, to wrap about the article. The wrapping tag has a longitudinal groove through which one end of the wrapping tag may loop through the groove and form a clove hitch knot about an article, such as a key or key ring.

As each sheet contains the same number or code for the control tag, customer claim check, and article wrapping tag, mismatching of the inventory control tags is minimized. Further, there is no need to locate a second attaching device, such as a key tag. These codes may be numeric, colored, or symbolic in a manner to aid in indexing and retrieval of objects.

As each sheet is constructed of paper, plastic, or other tear resistant bendable materials, they may be patterned and shaped in a variety of colors, logos, and designs. This allows the inventory control tags, claim checks and wrapping tags to be stamped with advertising, designs, or coupons, which can be used as a souvenir of a business or an event. If the inventory control tags, claim checks and wrapping tags are used to check vehicles into an amusement park or other event requiring vehicle check in, an additional scored or perforated tear strip can be included in the control tag section for separation and use as a wristband admission tag. In this preferred embodiment, each sheet is sized of sufficient length also to form a wristband to secure around a user's wrist. The wristband is generally patterned with an admission tab attached to display the numbering or coding to allow admission to an event.

If desired, the numbered control tag section can be further scored to form additional tear segments such as a coupons or prize giveaways for advertising purposes. Dealer incentives, and advertising to promote future attendance can thus be included as part of the inventory control invention. Thus, the improved system can be employed at various events to not only control entry and admission, but also the check in of articles and vehicles. It is particularly suited for valet parking and sporting events where it is necessary to check in vehicles as well as provide an admission receipt.

A preferred embodiment of the inventory control device adapted to check in vehicles for repairs is comprised of a pad of a plurality of sequentially numbered stacked bendable sheets. These sheets are made of a tear resistant material with adhesive strips usually along the top edge removably adhered to one another. Each sheet is then scored to removably separate into:

1) a coded two sided top segment forming a numbered control tag containing the adhesive strip along at least one edge to removably attach to an article.

2) a customer claim check having corresponding cooing as the control tag, and 3) a key tag having corresponding numbering as the control tag with ends of sufficient length and width to pass through an opening in an article and wrap about the article, the tag defining a longitudinal groove through which one end of the tag may loop through the groove and form a clove hitch knot about the article.

Preferably, the key tag has a segment independent of the loop segment containing the corresponding coding proximate the groove to provide greater visibility of the number. It is also preferable that the control tag, claim check, and key tag are made of a waterproof material for use out of doors. Waterproof sheets are a must for outdoor concerts and sporting events, to prevent inclement weather from damaging the control and key tags.

Thus the inventory control device not only provides an efficient, inexpensive, article tagging and check in system, it also provides an efficient inventory control method.

DESCRIPTION OF THE ILLUSTRATED EMBODIMENTS

Figure 1:
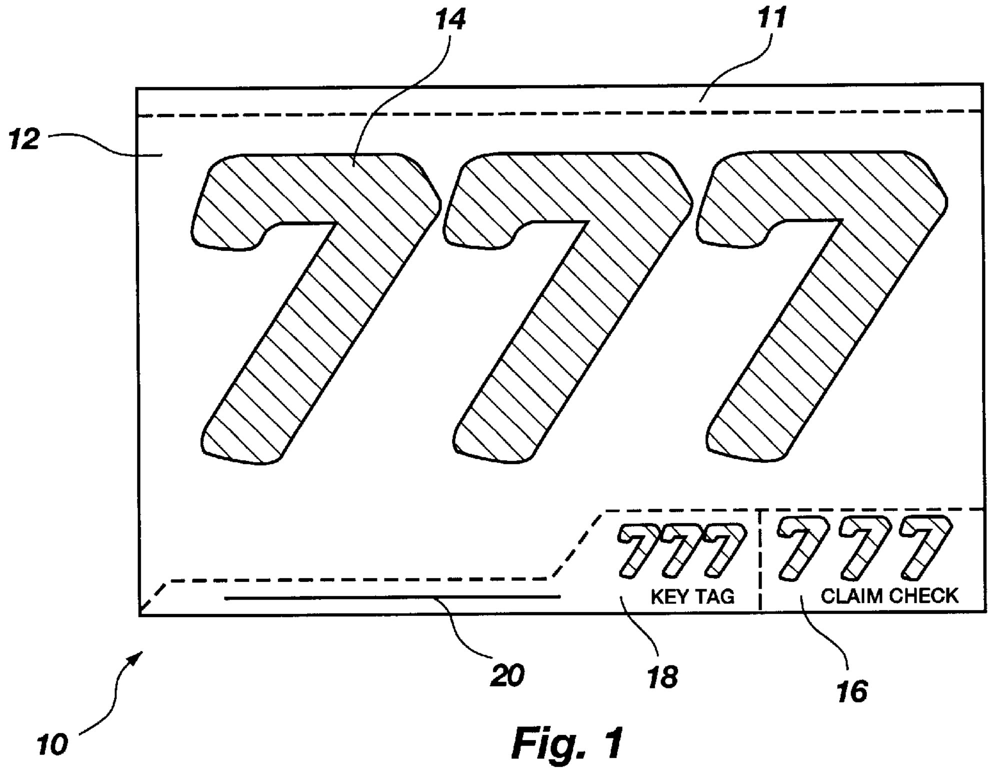
FIG. 1 is a front view of one preferred embodiment of the invention.

FIG. 1 is a front view of one preferred embodiment of the invention particularly adapted for use in motor vehicle repair. It comprises a flexible sheet 10 made of tear resistant Tyvek®. These sheets have colorless adhesive strips 11 shown in FIG. 4 along the top edge to removably adhere to one another. Each sheet 10 is scored and perforated to separate into three segments. The first segment is a coded two sided control tag 12 containing the adhesive strip along its top edge to removably attach to the windshield of a vehicle. This control tag 12 has a large visible inventory control number 14, which can be seen from the distance.

The second segment is a customer claim check 16, which has corresponding coding as the control tag 12. It is small enough to fit in a pocket, wallet, or purse, but large enough to be easily located. Generally, it is colored to aid in location.

The third segment is a key tag 18 having corresponding numbering as the control tag 12. The key tag 18 has ends of sufficient length and width to pass through a keyhole and wrap about the key. The key tag 18 has a longitudinal groove 20 through which one end of the key tag 18 may loop through the groove 20 and form a clove hitch knot about the key.

Figure 2:
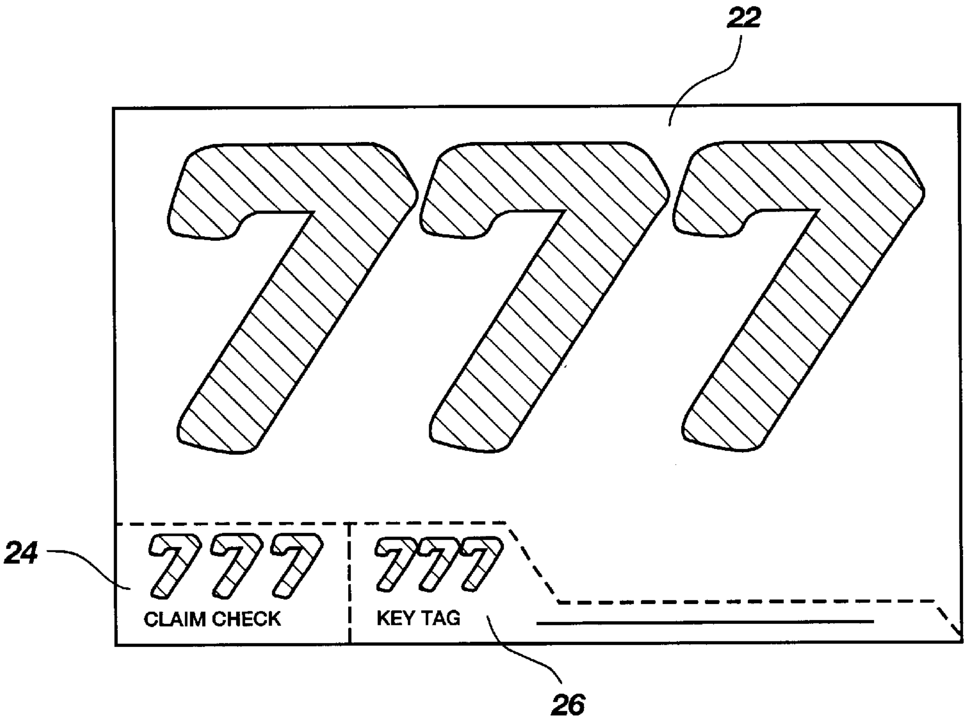
FIG. 2 is a back view of one preferred embodiment of the invention.

FIG. 2 illustrates the back view of the sheet 10 shown in FIG. 1 showing the back 22 of the control tag 12, the back 24 of the claim check 16, and the back 26 of the key tag. The backs of the control tag 12, the claim check 16 and the key tag 18 all have the same corresponding numbering as the inventory control number 14.

Figure 3:
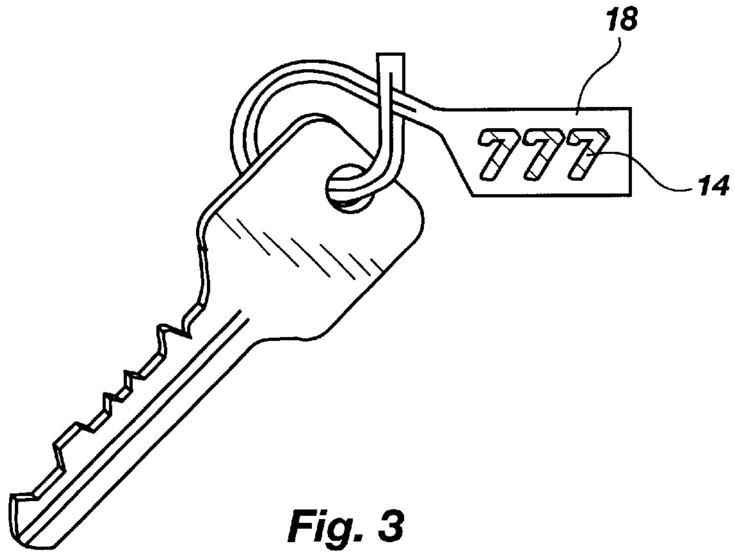
FIG. 3 is a perspective view of the embodiment shown in Fig. 1.

FIG. 3 is a perspective view of the embodiment shown in FIG. 1 showing how the key tag 18 secures around a key.

Figure 4:
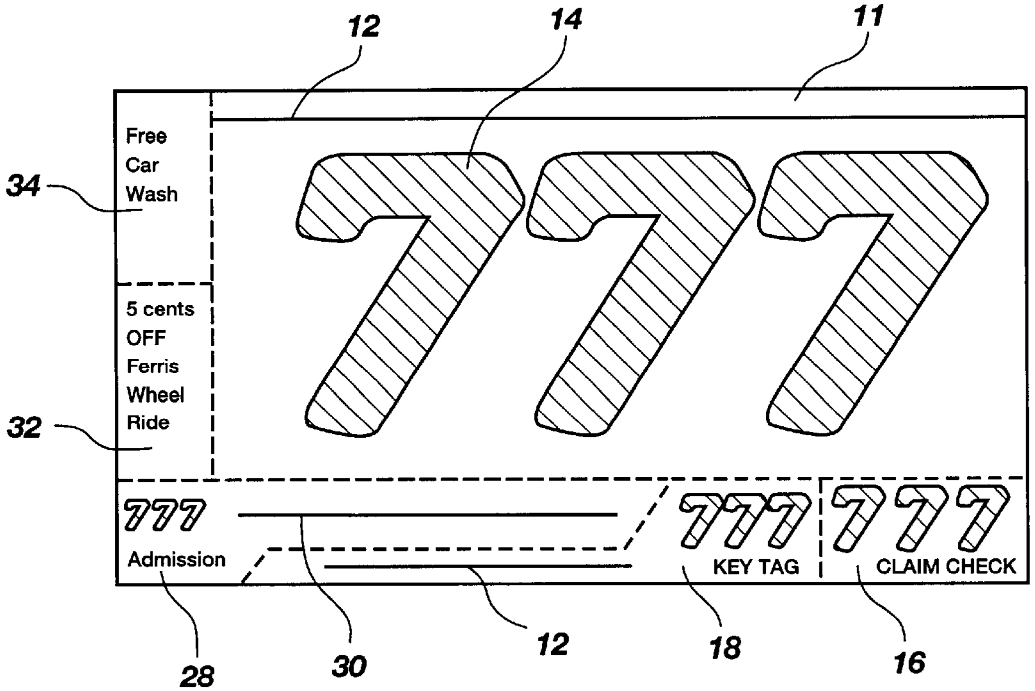
FIG. 4 is a perspective view of another preferred embodiment of the invention.

FIG. 4 is a perspective view of another preferred embodiment of the invention particularly adapted for use at admission parks, and outdoor events. In addition to the control tag 12, the key, the claim check 16, and the tag 18 used to inventory and park a patron's automobile, there is a fourth tear away segment admission bracelet 28. This admission bracelet 28 has a longitudinal groove 30, which similarly loops similarly about the wrist for admission into the event. Additional tear-away segment coupons 32, 34, are included as promotional incentives. Although an inventory control number 14 is shown, other business logos, pictures, event name, and coding systems could be used to provide a control tag 12, key tab 18 or bracelet 28 souvenir or advertising of the event. The sheets 10 may also be cut in different patterns, such as a snowflake used for skiing events, a golf ball used for golfing events, etc. Preferably, these sheets 10 are made of Tyke® to provide a strong water resistant key tab 18, bracelet 18, and control tab 12, suitable for outdoor events or use in water theme parks.

Figure 5:
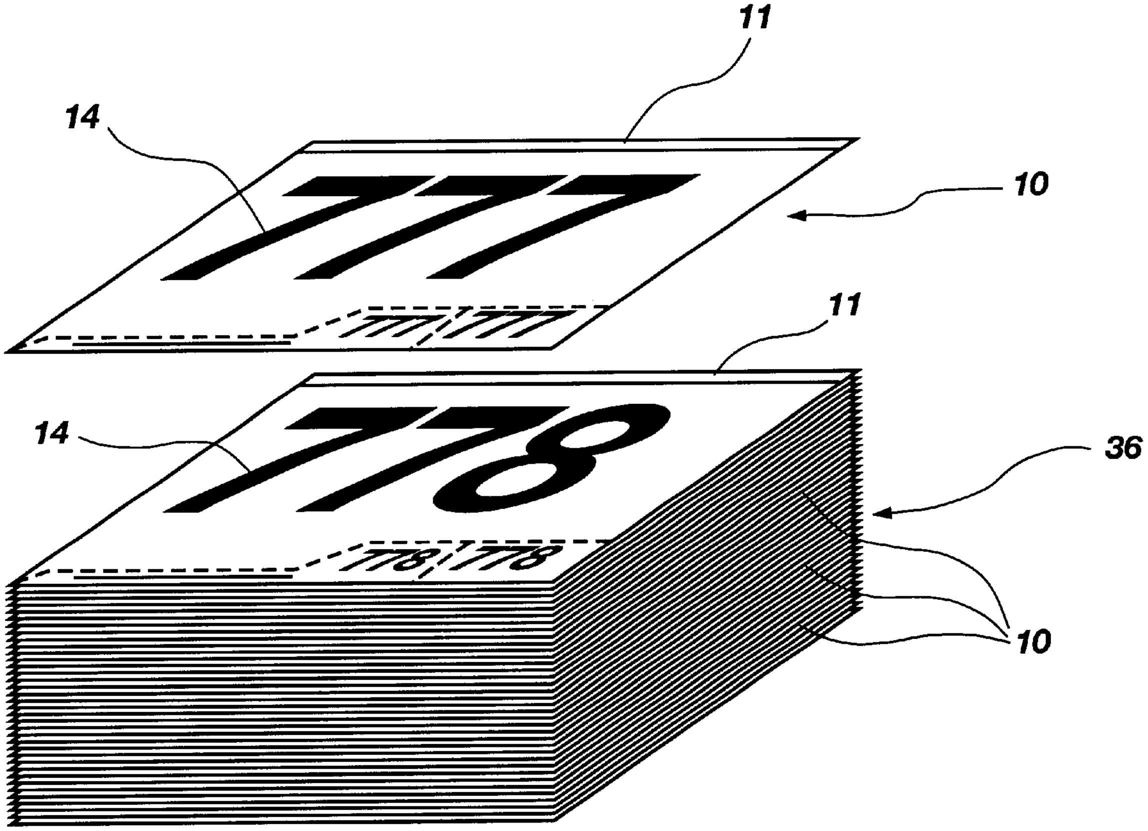
FIG. 5 is a perspective view of a pad of the embodiments shown in FIG. 1.

FIG. 5 illustrates a pad 36 of the preferred embodiments of the invention shown in FIG. 1, each consecutively numbered with the numbers increasing from top to bottom of the pad 36 to provide different individual control codes for each article checked in. These sheets 10 are removably secured in a pad via the adhesive strips 11, are disposable, and inexpensive to use compared to other inventory control check in methods.

Although the description of the invention has referred to the illustrated embodiments, it is not intended to restrict the scope of the appended claims. The claims themselves recite those features deemed essential to the invention.

I claim:

1. An inventory control device comprised of a bendable scored or perforated flexible tear resistant material to removably separate into at least three parts:

i) a coded control tag containing the adhesive strip to removably attach to an article, said coding sufficiently large to be viewed from a distance, ii) a customer claim check having corresponding coding to the coded control tag, and iii) a wrapping tag with ends of sufficient length to wrap about an article, and defining a longitudinal groove through which one end of the tag may loop through the groove and form a clove hitch knot about the article.

2. An inventory control device comprised of a plurality of sequentially coded stacked bendable tear resistant sheets removably adhered together with re-stickable adhesive strips, each sheet scored or perforated to removably separate into at least three parts:

i) a coded control tag containing the adhesive strip to removably attach to an article, said coding sufficiently large to be viewed from a distance, ii) a customer claim check having corresponding coding to the coded control tag, and iii) a wrapping tag with ends of sufficient length and width to fit through an opening in and wrap about an article, and defining a longitudinal groove through which one end of the tag may loop through the groove and form a clove hitch knot about the article.

3. An inventory control device according to claim 2, wherein the adhesive strips are placed along an edge of each sheet to form a pad.

4. An inventory control device according to claim 2, wherein the coded control tag contains numbering on both sides to be viewed from either side when mounted on a transparent surface.

5. An inventory control device according to claim 2, wherein each sheet is patterned and shaped to suit the preference of a user.

6. An inventory control device according to claim 2, wherein the wrapping tag is of sufficient length to secure around a user's wrist and structured to display the coding in a manner to allow viewing for admittance into an event.

7. An inventory control device according to claim 2, wherein the numbered control tag includes additional scorings to remove additional segments thereof which act as coupons or prize giveaways.

8. An inventory control device according to claim 2, wherein the sheets are numerically coded and stacked in sequence.

9. An inventory control device to check in vehicles comprised of a pad of a plurality of sequentially numbered stacked bendable sheets made of a tear resistant material removably adhered to one another with adhesive strips with re-stickable adhesive, each sheet scored to removably separate into at least three parts:

1) a numbered vehicle control tag with edges containing the adhesive strip along at least one edge to removably attach to an article, and having an inventory number on both sides of the control tag sufficiently large to be viewed from a distance, 2) a customer claim check having corresponding numbering to the control tag, and 3) a key tag having corresponding numbering to the control tag with ends of sufficient length and width to pass through a key hole or key ring wrap about the keys, the tag defining a longitudinal groove through which one end of the tag may loop through the groove and form a clove hitch knot about the article.

10. An inventory control device according to claim 9, wherein the key tag has a segment containing the corresponding number proximate the groove to provide greater visibility to the number.

11. An inventory control device according to claim 9, wherein the control tag, claim check, and key tag is made of a waterproof material.

12. An inventory control method for motor vehicles comprising:

a. separating a bendable tear resistant scored or perforated coded sheet having at least three parts:

i) a coded control tag containing the adhesive strip to removably attach to the motor vehicle, said coding sufficiently large to be viewed from a distance, ii) a customer claim check having corresponding coding to the coded control tag, and iii) a wrapping tag with ends of sufficient length and width to pass through a keyhole or key ring and wrap about motor vehicle keys, and defining a longitudinal groove through which one end of the tag may loop through the groove and form a clove hitch knot about the keys, b. removably attaching the control tag to the motor vehicle to be stored via the adhesive strip, c. giving a customer the claim check, d. securing the wrapping tag about the keys of the motor vehicle, and e. returning the motor vehicle and keys to the customer upon presentation of the claim check.

13. An inventory control method according to claim 12, wherein the control tag is scored and of sufficient length to form a removable wrist band defining a longitudinal groove through which one end of the wrist band may loop through the groove and form a clove hitch to secure around a user's wrist, and including an admission code to allow admittance into an event.

14. An inventory control method according to claim 13, wherein the numbered control tag includes additional scorings to allow removal of additional segments thereof which act as coupons or prize giveaways.

* * * * *